United States Patent
Syverson

[15] 3,676,764
[45] July 11, 1972

[54] BRUSHLESS ALTERNATING CURRENT GENERATOR

[72] Inventor: Charles D. Syverson, North Mankato, Minn.

[73] Assignee: Kohler Co., Kohler, Wis.

[22] Filed: Jan. 29, 1971

[21] Appl. No.: 111,124

Related U.S. Application Data

[63] Continuation-in-part of Ser. No. 860,264, Sept. 23, 1969, abandoned.

[52] U.S. Cl. .................................. 322/51, 310/198, 322/59, 322/62
[51] Int. Cl. ......................................................... H02k 19/28
[58] Field of Search .................... 322/51, 59, 60, 61, 62, 52; 310/187, 198

[56] References Cited

UNITED STATES PATENTS 3,059,168  10/1962  Sones et al. ................................ 322/59
3,154,708  10/1964  Shaffer ..................................... 310/187

Primary Examiner—Lewis H. Myers
Assistant Examiner—H. Huberfeld
Attorney—Arthur H. Seidel and Barry E. Sammons

[57] ABSTRACT

A self-excited brushless alternating current generator utilizes a four-pole direct current excitation winding wound on a stator and operable to generate an exciter flux which induces an alternating current in a field excitation winding wound on a rotor. The field excitation winding connects through rectifiers to a d-c main field winding also wound on the rotor. The main field winding generates a main field flux which induces an alternating current in a two-pole a-c output winding wound on the stator. No brushes are required and the exciter windings are wound on the same magnetic core with the generator windings.

6 Claims, 4 Drawing Figures

INVENTOR.
CHARLES D. SYVERSON

INVENTOR
CHARLES D. SYVERSON

BRUSHLESS ALTERNATING CURRENT GENERATOR

CROSS REFERENCE

This application is a continuation-in-part of the co-pending application Ser. No. 860,264 filed Sept. 23, 1969, and now abandoned, and entitled "Brushless Alternating Current Generator."

BACKGROUND OF THE INVENTION

1. Field of the Invention

The present invention relates to alternating current generators which can be used for both stationary and portable applications, and which have no slip rings or brushes.

2. Prior Art

Alternating current brushless generators have been known in the art, but generally involve very complicated windings and manufacturing procedures. For example, the U.S. Pat. to L. J. Clark, No. 2,761,081, shows a type of brushless alternating current generator, but in this generator it is necessary to have the individual windings at a selected length in order to create two fields on the rotor, which means that the windings themselves have to be very precise. Further, the device does not lend itself well for use with fairly low frequency current, such as a 60 cycle alternating current, because the device must have at least a four-pole output winding. This problem is compounded because it is desirable to operate portable generator units with standard internal combustion engines which operate more satisfactorily at high speeds, such as 3,600 rpm.

Another type of brushless a-c generator, like that disclosed in the patent to W. L. Sones et al., U.S. Pat. No. 3,059,168, includes an exciter whose rotor is mounted on the same shaft with the rotor of the main generator. Although this arrangement does provide a brushless machine, it is bulky and expensive because the exciter windings are wound on a magnetic core separate from the main generator magnetic core. The use of separate cores for the generator and exciter has been necessary in the past to overcome the distortion in the a-c output voltage resulting from interference between the flux generated by the exciter and the generator main field flux.

SUMMARY OF THE INVENTION

The present invention relates to a self-excited brushless a-c generator having a single magnetic core comprised of a stator and rotor, a multiple pole a-c output winding wound on the stator, a d-c main field winding wound on the rotor, a d-c excitation winding wound on the stator that has twice the number of poles as the a-c output winding, and a field excitation winding wound on the rotor. Direct current is supplied to the d-c excitation winding which induces an alternating current in the field excitation winding when the rotor is rotated. This alternating field current is rectified and supplied to the d-c main field winding to generate a rotating magnetic field which induces an alternating current in the a-c output winding.

A general objective of the invention is to provide an a-c generator in which exciter windings that supply the d-c main field winding of the generator are wound on the same magnetic core as the generator windings, and to combine these windings on the same core without distorting the a-c output voltage.

Another objective of the invention is to minimize saturation of the rotor, which is wound with both the generator d-c main field winding and the field excitation winding. The d-c main field winding is oriented to direct the main field flux through pole pieces formed in the rotor, and the field excitation winding is wound on either side of the pole pieces.

Still another objective of the invention is to provide a brushless, self-excited a-c generator which is compact, lightweight and particularly suited for portable applications.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in many different embodiments, and reference is made to the claims herein for interpreting the breadth of the inVention.

DESCRIPTION OF THE PREFERRED EMBODIMENT

Figure 1:
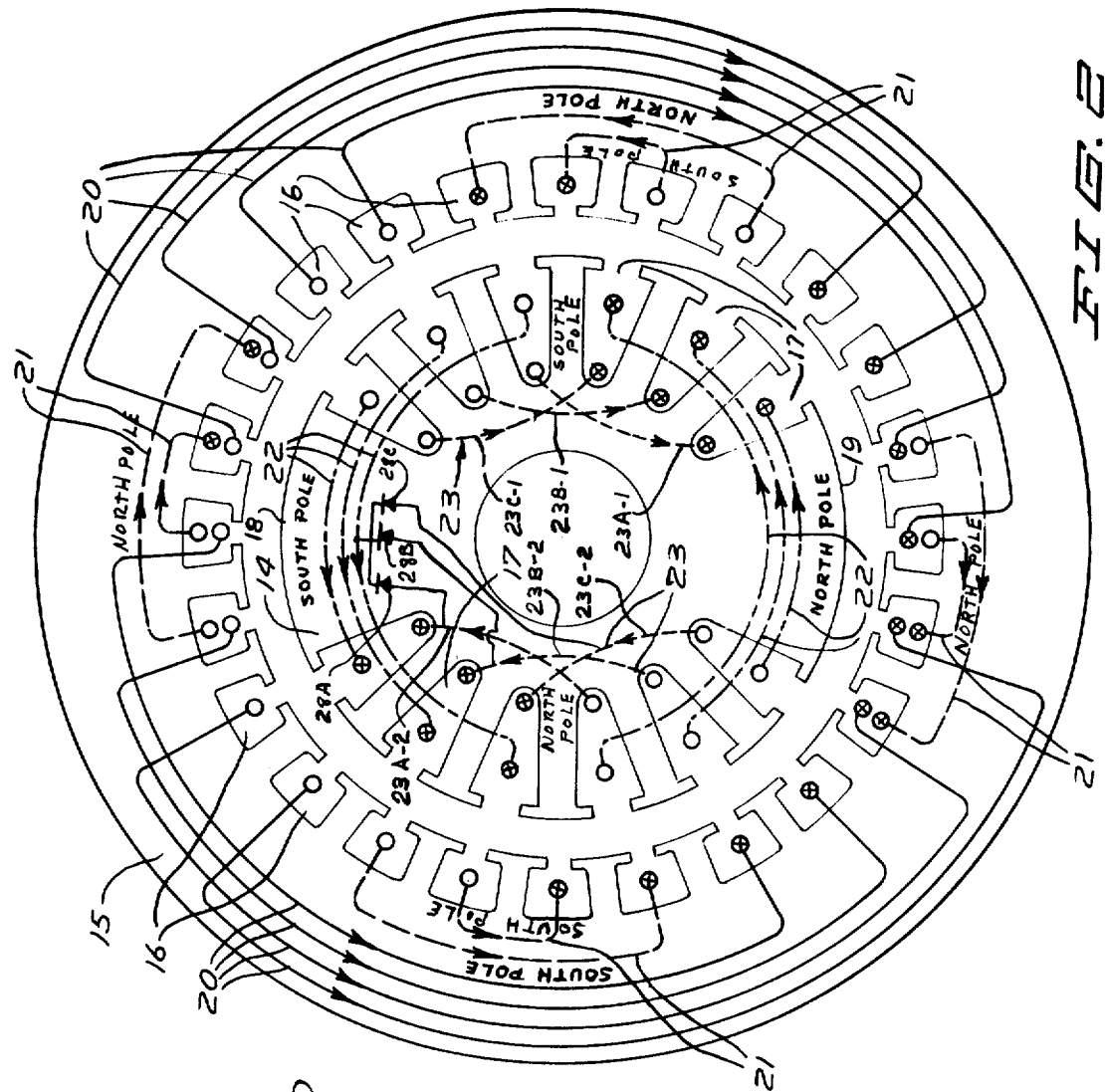
FIG. 1 is a vertical sectional view showing typical windings of a generator made according to the present invention.
Figure 2:
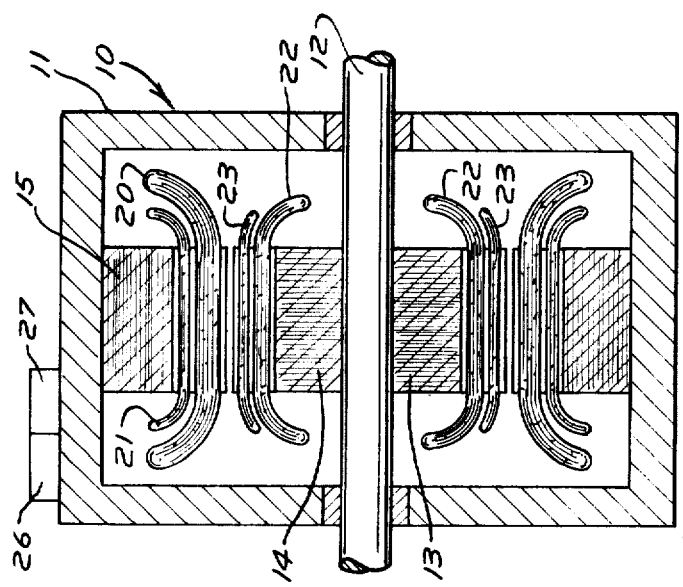
FIG. 2 is a part schematic end view showing the placement of the windings in the slots of the rotor and stator of the generator made according to the present invention.

Referring to FIGS. 1 and 2, the generator 10 is of a brushless design and includes an outer housing 11 rotatably supporting a shaft 12. A rotor 13 constructed of stacked plates 14 made of a magnetic material such as soft iron is attached to the shaft 12 and contained in the housing 11. Distributed about the circumference of the rotor 13 are a series of slots 17, each running the length of the rotor 13 parallel to the shaft 12. Securely mounted on the interior of the housing 11, around the rotor 13, is a stator 15 also constructed of stacked plates of magnetic material. The stator 15 is annular shaped, having a series of slots 16 distributed about its inside surface opposite the slots 17 in the rotor 13 and running substantially parallel to the shaft 12. In some applications it may be desirable to skew the slots 16 to shape the output waveform. The rotor 13 is separated by an air gap from the surrounding stator 15 and is driven by a suitable drive means attached to the shaft 12. The rotor 13 and stator 15 form a magnetic core for the generator.

In the preferred embodiment, as shown in FIG. 2, there are twelve slots 17 in the rotor 13 positioned in two groups of six about the rotor's axis of rotation. The six slots 17 in each group are spaced 12 ½° apart, and the two groups are spaced from each other to form south and north pole pieces 18 and 19, that present substantial pole face areas without interruption by rotor slots. The stator 15, on the other hand, has 24 slots 16, equally spaced around the circumference of its inside surface.

The generator has four separate and distinct windings placed in the slots 16 and 17 to perform both the main generator and exciter functions. The location of the windings in the slots 16 and 17 are shown schematically in FIG. 2, and their electrical connections are shown schematically in FIG. 4. An a-c output winding 20 is wound in the slots 16 of the stator 15 to provide the main generator output voltage. This output winding 20 is formed in two sections, each section occupying half the stator slots 16 and wound opposite each other in a standard two-pole configuration common to stationary armature a-c generators. The number of turns in each section of the output winding 20 is the same and is chosen to obtain the output voltage desired. As shown schematically in FIG. 4, the two sections of the output winding 20 are connected in series to provide 230 volts across both of them, or 115 volts across each section individually. The generator described herein is single phase, however, the invention is equally applicable to polyphase generatorS.

A d-c excitation winding 21 (shown in long dashed lines) is also wound in the slots 16 of the stator 15. The excitation winding 21 is formed of four series connected section arranged in quadrature around the stator 15 to form a standard four-pole winding. The four poles are 90 degrees apart with two of its opposing poles aligned with two opposing poles of the output winding 20. The four sections of the d-c excitation winding 21 are wound and connected together to obtain four poles with alternating polarity (north-south-north-south) when the excitation winding 21 is energized with a d-c voltage. The d-c excitation winding 21 has polar wound coils which are doubled up in the stator slots 16 with some of the coils of the output winding 20 and suitable insulating separators are used between the coils of windings 20 and 21. Within these slots 16, the coils of the d-c excitation winding 21 are wound first, or deepest and the coils of the output winding 20 are wound on top, closer to the air gap and rotor 13. Slot wedges close the slots 16 and retain the windings 20 and 21 in place.

The rotor 13 also carries two windings, a d-c main field winding 22 and a field excitation winding 23. The d-c main field winding 22 is comprised of two sections connected in series to form a standard distributed field concentric wound two-pole winding. The two sections of the d-c main field winding 22 are wound around the pole pieces 18 and 19 in the rotor slots 17. The d-c main field winding 22 is oriented such that its two poles are coincident with the pole pieces 18 and 19.

The field excitation winding 23 has three single phase windings 23A, 23B and 23C, and each phase winding 23A, B and C is formed by two parallel connected sections, indicated in FIG. 2 by the notations −1 and −2. As shown in FIG. 1, the two windings 22 and 23 are doubled up in the rotor slots 17, the d-c main field winding 22 being wound first, or deepest in the slots 17, and the field excitation windings 23 being wound on top, closer to the air gap and stator 15.

The field excitation winding 23 is non-symmetrical, each of the three phase windings 23A, 23B and 23C being formed by combining two parallel sections 23A-1 and 23A-2; 23B-1 and 23B-2; and 23C-1 and 23C-2. The two sections of each phase winding are on opposite sides of the rotor 13, and each section is wound in two rotor slots 17 which are separated from each other by two slots 17 occupied by other sections. The sections are wound and connected in parallel so that current generated in them is additive when the rotor 13 is rotating.

Figure 4:
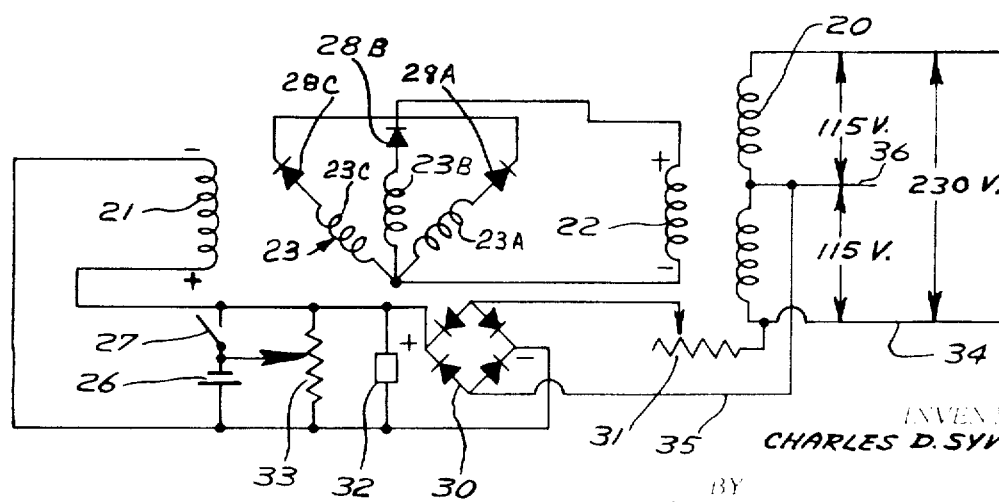
FIG. 4 is an electrical schematic diagram of the generator of the present invention

Referring to FIGS. 2 and 4, one end of each phase winding 23A, 23B and 23C is connected to a common neutral point which in turn is connected to one end of the d-c main field winding 22. The other ends of the phase windings 23A, 23B and 23C are each connected through respective rectifier diodes 28A, 28B and 28C to the other end of the d-c main field winding 22. The diodes 28A, 28B and 28C are securely fastened to the rotor 13 and connected to conduct positive current from each phase winding of the field excitation winding 23 to the d-c field winding 22.

Because the generator 10 is self-excited, a small amount of power is required when starting the generator to generate field current. Referring to FIG. 4, this power is furnished by a battery 26 connected in series with a switch 27 across the d-c excitation winding 21. The switch 27 is spring biased open and is operated by holding it closed until the generator output voltage is sufficient to sustain operation. Other methods for field flashing are known and can be used with the present invention.

Self-excitation is sustained by feeding power from the output of the generator 10 back to the d-c excitation winding 21. Such "closed loop" excitation of the generator 10 is common, but is not necessary to practice the present invention. However, it is preferable because it also serves as a ready means to regulate the output voltage under varying load conditions common to portable type generators.

As shown in FIG. 4, excitation power is taken off one section of the a-c output winding 20 at the leads 34 and 36. The center tap lead 36 is connected to a full-wave bridge rectifier 30 by a lead 35 and the lead 34 connects to the rectifier 30 through a potentiometer 31. The output of the bridge rectifier connects directly across the d-c excitation winding 21. A voltage surge suppressor 32 of conventional design is also connected across the d-c excitation winding 21 to suppress voltage spikes. A charging potentiometer 33 connects across the output of the rectifier 30 and its slider connects to the positive terminal of the battery 26 to provide charging current thereto.

OPERATION

After initial excitation by the battery 26 an a-c output voltage is established across terminals 34 and 36. This a-c voltage is rectified by rectifier 30 and applied to the four-pole d-c excitation winding 21 to produce the exciter flux pattern 25 shown in FIG. 3. During steady state conditions, the flux pattern 25 is constant, disregarding a-c reaction flux components, although it varies in magnitude in response to load changes on the output of the generator 10. The exciter flux pattern 25 induces an a-c voltage into each phase (A, B and C) of the field excitation winding 23. The three resulting a-c voltages are 45 electrical degrees apart due to the asymmetric arrangement of the phase windings 23A, 23B and 23C on the rotor 13. Each a-c voltage is half-wave rectified by the diodes 28A–C and applied to the two-pole main field winding 22. As shown by the dotted lines in FIG. 3, a main field flux pattern 24 results. The field flux pattern 24 is also constant, disregarding a-c reaction flux components, during steady state conditions, however, it is rotating with the rotor 13. This rotating field 24 induces an a-c output voltage in the two-pole a-c output winding 20.

The number of turns in the d-c excitation winding 21 is selected to provide the desired excitation flux 25 under steady state conditions for the exciter voltage used. The number of turns in each of the three phase windings of the field excitation winding 23 is chosen to generate the desired steady state field current to the main field winding 22. The number of turns in the a-c output winding 20 is then determined to give the steady state output voltage (230 or 115 volts). Known design formulas are used for these calculations and it should be apparent to those skilled in the art that because of the closed loop operation, there is great latitude in the choice of coil sizes for a given set of design parameters.

Because the exciter comprising the d-c excitation winding 21 and field excitation winding 23 is contained on the same magnetic core with the main generator, there are two d-c current flux patterns established in the same magnetic iron. The present invention successfully prevents interference between these flux patterns, which interference would otherwise result in distortion of the generator a-c output voltage. More particularly, by winding the d-c excitation winding 21 with twice the number of poles (four) as the a-c output winding 20, the a-c output winding 20 is made insensitive to changes in the exciter flux pattern 25. Interference is prevented by this arrangement as long as the magnetic core does not saturate.

Figure 3:
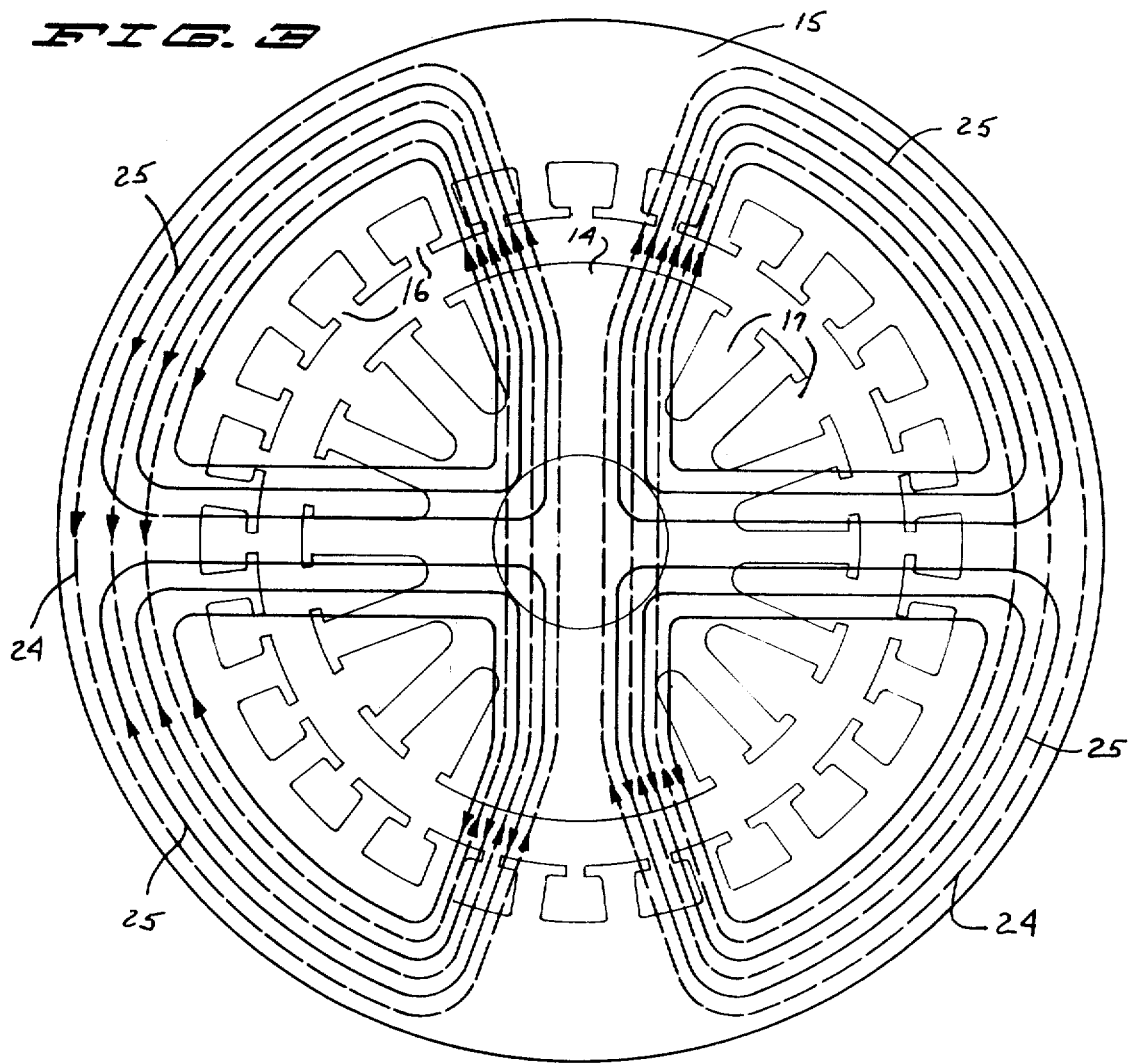
FIG. 3 is a schematic view of the generator showing the flux pattern of the d-c main field and d-c excitation windings.

To minimize saturation in the rotor 13, the rotor slots 17 are divided into two groups to allow formation of the pole pieces 18 and 19. The d-c main field winding 22 is wound to generate the field flux pattern 24 through them. The pole pieces 18 and 19 minimize flux density by providing a solid pole of large cross section, so that when the flux patterns 24 and 25 are cumulative as shown in FIG. 3, saturation will not occur.

The principle of the invention operates as long as there are twice as many poles on the d-c excitation winding 21 as the a-c output winding 20. For example, interference is prevented with an eight-pole excitation winding 21 and a four-pole a-c output winding 20.

I claim:

1. An alternating current generator the combination comprising:
   a magnetic core having a stator and a rotor;
   an a-c output winding wound on the stator of said magnetic core and having a fixed number of poles;
   a d-c main field winding wound on the rotor of said magnetic core and operable to induce an alternating current in said a-c output winding when the rotor is rotated and a direct current is supplied to the d-c main field winding;
   a rectifier circuit mounted on said rotor and connected to conduct direct current to said d-c main field winding when supplied with an alternating current;
   a d-c excitation winding wound on the stator of said magnetic core and having twice as many poles as said a-c output winding; and a field excitation winding wound on the rotor of said magnetic core, connected to said rectifier circuit, and operable to generate an alternating current to said rectifier circuit when the rotor is rotated and the d-c excitation winding is supplied with direct current.

2. The alternating current generator as recited in claim 1, wherein the poles of said a-c output winding are equally spaced around the axis of rotation of said rotor, and the poles of said d-c excitation winding are equally spaced around the axis of rotation of said rotor.

3. The alternating current generator as recited in claim 2, wherein the poles of said a-c output winding are in alignment with poles of said d-c excitation winding.

4. The alternating current generator as recited in claim 2, wherein the rotor of said magnetic core has a pair of pole pieces and said d-c main field winding has two poles aligned with said pole pieces.

5. The alternating current generator as recited in claim 4, wherein said field excitation winding is comprised of a plurality of phase windings connected to generate a polyphase alternating current to said rectifier circuit.

6. The alternating current generator as recited in claim 5, wherein said phase windings each have a pair of poles and the resulting poles of said field excitation winding are asymmetrically arranged around the axis of rotation of said rotor.

* * * * *